(12) United States Patent
Li (10) Patent No.: US 11,896,116 B1
(45) Date of Patent: Feb. 13, 2024

(54) ELECTRIC TOOTHBRUSH ROTATING REPLACEMENT HEAD DEVICE (71) Applicant: Shenzhen Blue Dream Digital Technology Co., Ltd., Shenzhen (CN)

(72) Inventor: Mingyuan Li, Maoming (CN)

(73) Assignee: SHENZHEN BLUE DREAM DIGITAL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/335,966

(22) Filed: Jun. 15, 2023

(51) Int. Cl.
 *A46B 5/00* (2006.01)
 *A61C 17/22* (2006.01)
 *A61C 17/26* (2006.01)
 *A61C 17/34* (2006.01)
 *A46B 9/04* (2006.01)

(52) U.S. Cl.
 CPC .............. *A46B 5/0095* (2013.01); *A46B 9/04* (2013.01); *A61C 17/222* (2013.01); *A61C 17/26* (2013.01); *A61C 17/34* (2013.01); *A46B 2200/1066* (2013.01)

(58) Field of Classification Search
 CPC ..... A46B 5/0095; A61C 17/222; A61C 17/26; A61C 17/34; A61C 17/3427
 See application file for complete search history.

(56) References Cited

U.S. PATENT DOCUMENTS 5,577,285 A * 11/1996 Drossler ............ A61C 17/3436
 15/28
9,724,181 B2 * 8/2017 Schaefer .............. A61C 17/222

FOREIGN PATENT DOCUMENTS

CN 114557788 A * 5/2022
KR 10-2006-0003497 A * 1/2006

* cited by examiner

Primary Examiner — Randall E Chin
(74) Attorney, Agent, or Firm — Zhigang Ma (57) ABSTRACT

An electric toothbrush rotating replacement head device includes a toothbrush replacement head body. The toothbrush replacement head body includes a toothbrush handle and a toothbrush head, the toothbrush handle defines a cavity, the toothbrush head is disposed on a top of the cavity, an inside of the cavity is provided with an elastic connecting rod, a bottom of the elastic connecting rod is provided with a spring limiting disc, a top of the elastic connecting rod defines a first pin hole, the elastic connecting rod is disposed in a compression spring, and the compression spring is disposed on the spring limiting disc. The toothbrush head includes a convex block, the convex block defines a second pin hole, and the elastic connecting rod is inserted into the second pin hole and connected to the toothbrush head through the pin.

20 Claims, 7 Drawing Sheets

ELECTRIC TOOTHBRUSH ROTATING REPLACEMENT HEAD DEVICE

TECHNICAL FIELD

The disclosure relates to the technical field of electric toothbrushes, and particularly to an electric toothbrush rotating replacement head device.

BACKGROUND

An electric toothbrush usually has a removable and replaceable attached brush, also known as "replacement head", so that a handle of the electric toothbrush can be used by multiple family members, and each family member can own an independent personal replacement head. Moreover, when a brush head is worn and needs to be replaced, only the replacement head needs to be replaced instead of replacing the entire electric toothbrush including the handle.

During a process of brushing teeth, various forces generated during the process of brushing teeth must be transmitted through a connection between the replacement head and the handle. These forces specifically include cleaning, driving, axial and radial forces acting on the replacement head and/or handle. The connection between the replacement head and the handle is usually realized in a manner that the radial force is absorbed or dissipated in the handle as well as the axial force is absorbed or dissipated in a driving shaft. Therefore, a tubular connection part of the replacement head is usually pushed onto a connection rod or a neck of the toothbrush, and a drive shaft provided in a brush tube of the replacement head is connected to a drive shaft protruding from an end of a connection rod of the handle.

The electric toothbrush is widely used due to its high efficiency, portability and good cleaning effect. Most of the existing electric toothbrushes drive the brush head to vibrate through a rapid rotation of a motor, so as to ensure a good cleaning effect. However, an internal structure of the existing electric toothbrush is complex, too many assembly parts bring corresponding cost during the production of the electric toothbrush, and a damage rate of the electric toothbrush is high. In addition, the high-speed rotation of the motor drives the brush head to vibrate through a transmission assembly, and the instability of the internal structure is easy to cause structure damages, thereby affecting a normal use of the electric toothbrush and causing a poor tooth cleaning effect.

At present, the electric toothbrush on the market is difficult to be flexibly removed and replaced the brush head device, and it is very inflexible and inconvenient to replace the toothbrush head. Therefore, consumers hope to have an electric toothbrush that is more convenient to use, more flexible to install and disassemble, and has a better tooth cleaning effect.

SUMMARY

A main purpose of the disclosure is to provide an electric toothbrush rotating replacement head device, which has advantages of simple structure, more flexible installation and disassembly, more convenient use, better tooth cleaning effect and multiple functions.

In order to achieve the above purpose, the disclosure provides an electric toothbrush rotating replacement head device, the device includes a toothbrush replacement head body. The toothbrush replacement body includes a toothbrush handle and a toothbrush head, the toothbrush handle defines a cavity, and the toothbrush head is disposed on a top of the cavity, the device includes:

an elastic connecting rod disposed in the cavity, and a top of the elastic connecting rod defining a first pin hole;

a spring limiting disc disposed on a bottom of the elastic connecting rod;

a pin disposed in the first pin hole, and a diameter of the first pin hole being greater than a diameter of the pin;

a compression spring disposed on the spring limiting disc, and the elastic connecting rod being disposed in the compression spring; and the toothbrush head includes a convex block, the convex block defines a second pin hole, and the elastic connecting rod is inserted into the second pin hole through the pin and connected to the toothbrush head.

The toothbrush head includes a convex block, the convex block defines a second pin hole, and the elastic connecting rod is inserted into the second pin hole through the pin and connected to the toothbrush head.

In an embodiment, the device includes: a first spring limiting block and a second spring limiting block disposed on two sides of the elastic connecting rod respectively.

In an embodiment, the elastic connecting rod defines an installation groove disposed above the first spring limiting block and the second spring limiting block.

In an embodiment, a part of the elastic connecting rod from the installation groove to the pin is in a bent shape.

In an embodiment, the spring limiting disc defines a vent groove, and the device includes a cross bone disposed under the spring limiting disc.

In an embodiment, the device includes a spring sleeve, and the elastic connecting rod is disposed in the spring sleeve through the compression spring.

In an embodiment, a top of the spring sleeve defines limiting grooves.

In an embodiment, the device includes a buckle disposed a side of the spring sleeve.

In an embodiment, the toothbrush head includes a positioning step, and the convex block is connected to the toothbrush head through the positioning step.

In an embodiment, the toothbrush head includes an inner cylinder disposed in the convex block and a rotating shaft disposed on the inner cylinder.

In an embodiment, the inner cylinder defines a rotating shaft hole, and the rotating shaft is connected to the inner cylinder through an interference fit between the rotating shaft hole and the rotating shaft.

In an embodiment, the toothbrush head includes a first connecting bone and a second connecting bone, and the convex block is connected to the inner cylinder through the first connecting bone and the second connecting bone.

In an embodiment, a first spacing cavity and a second spacing cavity are provided between the first connecting bone and the second connecting bone.

In an embodiment, the toothbrush handle includes a rotation limiting column disposed at the top of the cavity.

In an embodiment, a rotating shaft through hole is disposed at a side of the rotation limiting column.

In an embodiment, the toothbrush head includes a bristle top cover and a bristle bottom cover; the bristle top cover defines bristle holes, and the bristle bottom cover defines a glue-overflow groove.

In an embodiment, a bottom of the cavity is provided with an opening, a first elastic sheet and a second elastic sheet are disposed in the opening, an installation clamping groove is provided between the first elastic sheet and the second elastic sheet, and an avoid groove is provided between a side wall of the opening and the second elastic sheet.

In an embodiment, the first elastic sheet defines a first clamping groove and the second elastic sheet defines a second clamping groove.

In an embodiment, the first elastic sheet and the second elastic sheet include reinforcing blocks respectively.

The disclosure has the following five beneficial technical effects.

1) The device of the disclosure uses the compression spring as a reset power for reciprocating motion to drive the elastic connecting rod to move. Compared with a structure in the related art that uses a main shaft magnet to attract an iron piece to generate power, the structure of the device of the disclosure is simple and the motion is reliable.
2) The rotating shaft is firmly connected to the toothbrush head through an interference fit, the rotating shaft and the rotating shaft through hole of the toothbrush handle are precisely fitted, and thus the stability of rotary actions is improved and operation noises are reduced.
3) The structure of the device is simplified and the cost of the device is reduced through an integrated elastic structure composed of the toothbrush handle and the toothbrush head.
4) The stability of the reciprocating motion of the compression spring is improved by a precise fit between the compression spring and the spring limiting disc.
5) The rusting pollution of copper strips is reduced by a copper-free bristle planting process, which is more health to human.

BRIEF DESCRIPTION OF DRAWINGS

In order to provide a clearer explanation of embodiments of the disclosure or the technical solution in the related art, a brief description will be given to the attached drawings required in the description of the embodiments or the related art. It is apparent that the attached drawings in the following description are only some embodiments of the disclosure. For those ordinary skilled in the art, other attached drawings can be obtained based on structures shown in these drawings without any creative work.

DESCRIPTION OF REFERENCE NUMERALS

100—toothbrush replacement head body; 10—toothbrush handle; 101—cavity; 11—elastic connecting rod; 111—spring limiting disc; 112—cross bone; 113—vent groove; 114—curved surface contact point; 1151—first spring limiting block; 1152—second spring limiting block; 116—installation groove; 117—pin; 1171—first pin hole; 12—compression spring; 121—spring installation hole; 122—spring sleeve; 123—top of the spring sleeve; 124—sleeve convex block; 1241—elastic connecting rod through hole; 1242—limiting groove; 1221—buckle; 13—cylinder; 131—rotating shaft through hole; 14—rotation limiting column; 15—buckle hole; 16—opening; 161—first elastic sheet; 162—second elastic sheet; 1611—first clamping groove; 1612—second clamping groove; 163—installation clamping groove; 164—avoid groove; 165—side wall; 1631—first reinforcing block; 1632—second reinforcing block; 20—toothbrush head; 201—second pinhole; 202—first connecting bone; 203—first spacing cavity; 204—inner cylinder; 205—second connecting bone; 206—convex block; 207—positioning step; 208—second spacing cavity; 209—rotating shaft hole; 21—bristle top cover; 211—top cover connecting surface; 212—hot-melt adhesive nail; 213—bristle hole; 214—bristle; 22—bristle bottom cover; 221—bottom cover connecting surface; 222—ultrasonic line; 223—glue-overflow groove; 23—rotating shaft; 30—main body; 31—main body shaft; 32—main body buckle.

The purpose, functional features, and advantages of the disclosure will be further explained in conjunction with the embodiments, with reference to the attached drawings.

DETAILED DESCRIPTION OF EMBODIMENTS

The following will provide a clear and complete description of the technical solution in the embodiments of the disclosure in conjunction with the attached drawings. Apparently, the described embodiments are only parts of the embodiments of the disclosure, not all of them. Based on the embodiments in the disclosure, all other embodiments obtained by those ordinary skilled in the art without creative work should fall within the scope of protection of the disclosure.

It should be noted that all directional indications (such as up, down, left, right, front, and back) in the embodiments of the disclosure are only used to explain the relative position relationship, motion situation, etc. between components in a specific posture (as shown in the attached drawings). If the specific posture changes, the directional indication also changes accordingly.

In the disclosure, unless clearly defined and limited, the terms "connect", "fix", etc. should be understood in a broad sense, for example, "fix" can be a fixed connection, a detachable connection, or an integrated connection; it can be a mechanical connection or an electrical connection; it can be a direct connection or indirect connection achieved through an intermediate medium, it can be an internal connection between two components or an interactive relationship between two components. For those ordinary skilled in the art, the specific meanings of the above terms in the disclosure can be understood based on specific situations.

In addition, if there are descriptions of "first", "second", etc. in the embodiments of the disclosure, the descriptions of "first", "second", etc. are only used for a purpose of description and cannot be understood as indicating or implying their relative importance or implying the number of indicated technical features. Therefore, features limited with "first" and "second" can explicitly or implicitly include at least one of the features. In addition, the meaning of "and/or" in the disclosure includes three parallel schemes. Taking "A and/or B" as an example, it includes scheme A, scheme B, or a scheme including both A and B. In addition, technical solutions among various embodiments can be combined with each other, but must be based on the ability of those ordinary skilled in the art to achieve. When the combination of the technical solutions conflicts or cannot be achieved, it should be considered that the combination of the technical solutions does not exist and is not within the scope of protection required by the disclosure.

The disclosure provides an electric toothbrush rotating replacement head device.

Embodiment 1

Referring to FIGS. 1~6 and FIG. 9, in the embodiment of the disclosure, the electric toothbrush rotating replacement head device includes a toothbrush replacement head body 100, the toothbrush replacement head body 100 includes a toothbrush handle 10 and a toothbrush head 20, and the toothbrush handle 10 defines a cavity 101. Preferably, two ends of the cavity 101 are opened.

The toothbrush head 20 is disposed on a top of the cavity 101, an inside of the cavity 101 is provided with an elastic connecting rod 11, a bottom of the elastic connecting rod 11 is provided with a spring limiting disc 111, and the elastic connecting rod 11 defines a first pin hole 1171 on the top of the elastic connecting rod 11. The first pin hole 1171 is provided with a pin 117 therein, and a diameter of the first pin hole 1171 is greater than a diameter of the pin 117, in other words, the first pin hole 1171 is in a clearance fit with the pin 117. The first pin hole 1171 is configured to be connected to an end of the pin 117.

The elastic connecting rod 11 is provided with a compression spring 12 and disposed in the compression spring 12, and the compression spring 12 is disposed on the spring limiting disc 111.

The toothbrush head 20 includes a convex block 206, preferably, the convex block 206 is cylindrical. The convex block 206 defines a second pin hole 201, a diameter of the second pin hole 201 is basically the same as that of the pin 117. The second pin hole 201 is connected to the other end of the pin 117, and the second pin hole 201 is tightly fitted with the other end of the pin 117. The elastic connecting rod 11 is inserted into the second pin hole 201 through the pin 117 and connected to the toothbrush head 20.

In the embodiment, the toothbrush handle 10 is a tubular structure with the cavity 101 inside. Preferably, two ends of the cavity 101 are opened for installing the elastic connecting rod 11 inside the toothbrush handle 10. The top of the elastic connecting rod 11 extends to a back of the toothbrush head 20, and the top of the elastic connecting rod 11 defines the first pin hole 1171. Preferably, an end of the pin 117 is connected to the first pin hole 1171, and the other end of the pin 117 is connected to the toothbrush head 20 through the second pin hole 201. Preferably, circular hole positions of the second pin hole 201 and the first pin hole 1171 are concentric, and the elastic connecting rod 11 is connected to the toothbrush head 20 through the pin 117.

In the embodiment, the diameter of the first pin hole 1171 is greater than the diameter of the pin 117, in other words, the diameter of the pin 117 is slightly smaller than the diameter of the first pin hole 1171. Therefore, there is a narrow spacing between the first pin hole 1171 and the pin 117, and the first pin hole 1171 and the pin 117 can rotate with each other. The toothbrush head 20 is connected to the elastic connecting rod 11 through the pin 117, thereby forming a transmission mechanism configured to convert a linear movement into a rotary oscillation.

In the embodiment, the bottom of the elastic connecting rod 11 is provided with the spring limiting disc 111, the elastic connecting rod 11 is sleeved in the compression spring 12, and the compression spring 12 is disposed on the spring limiting disc 111. A front wall of the cavity 101 serves as a limiting surface of a spring sleeve 122, the spring limiting disc 111 limits the compression spring 12 from falling off, and a top surface of the spring limiting disc 111 serves as a driving surface for the rebound of the compression spring 12.

Figure 5:
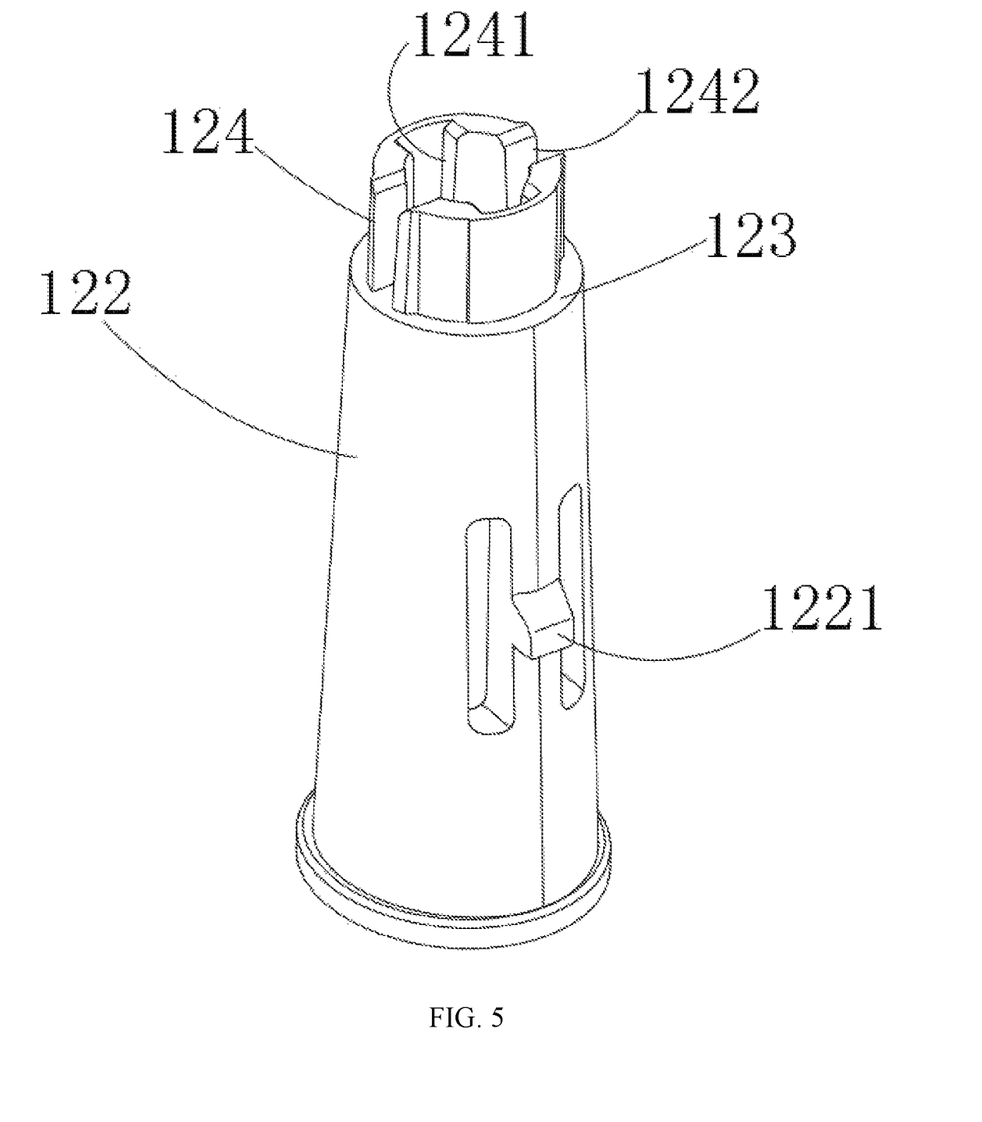
FIG. 5 illustrates a structural schematic diagram of a spring sleeve of the electric toothbrush rotating replacement head device according to the embodiment of the disclosure.

The spring sleeve 122 defines a spring installation hole 121, the circumferential surface of the spring limiting disc 111 fits with the spring installation hole 121, thereby guiding the compression spring 12, increasing the stability of the reciprocating motion of the elastic connecting rod 11, and reducing noises.

Figure 1:
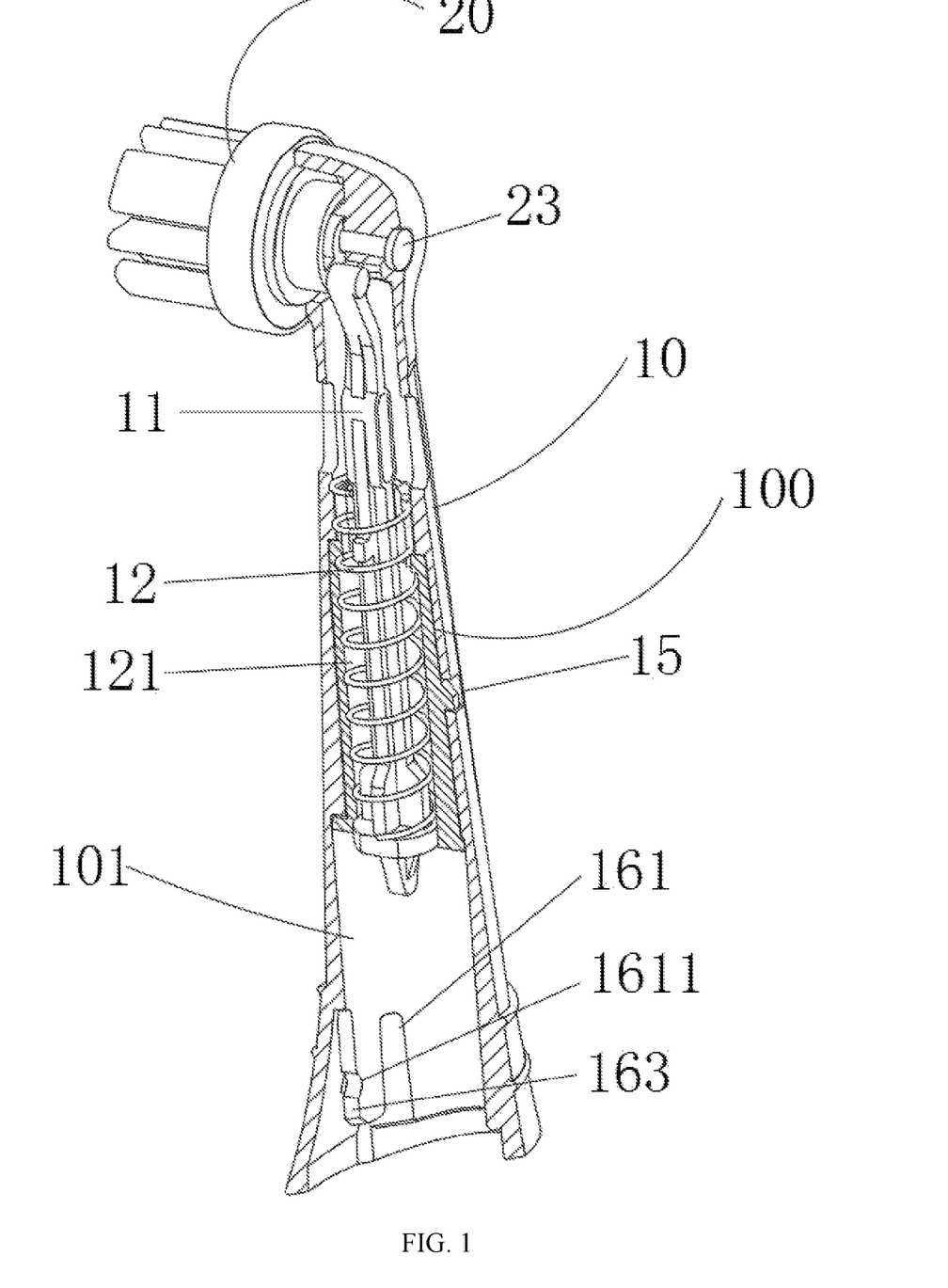
FIG. 1 illustrates a structural schematic diagram of an electric toothbrush rotating replacement head device according to an embodiment of the disclosure.
Figure 4:
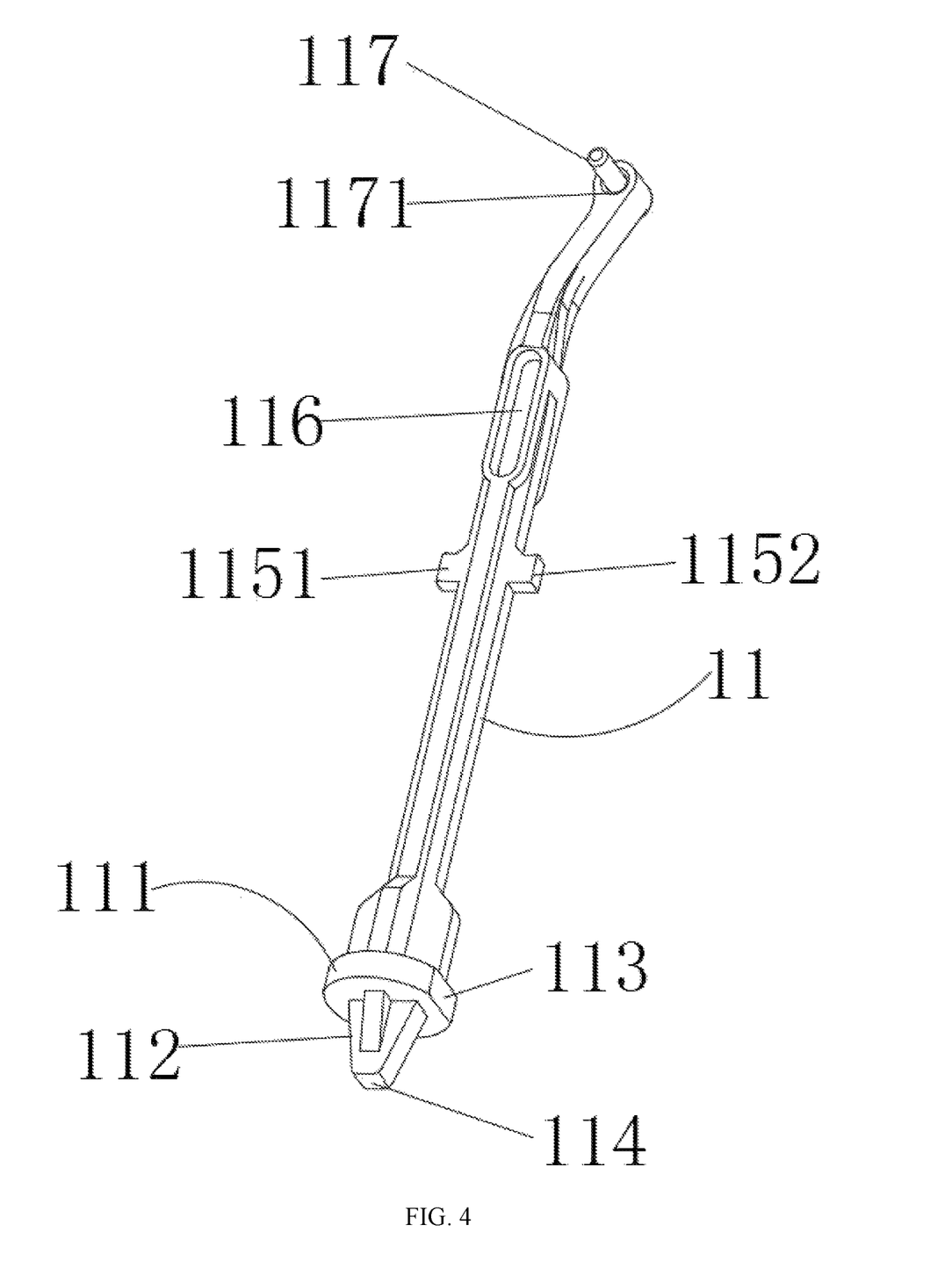
FIG. 4 illustrates a structural schematic diagram of an elastic connecting rod of the electric toothbrush rotating replacement head device according to the embodiment of the disclosure.

Referring to FIG. 1 and FIG. 4, in the embodiment, preferably, two sides of the elastic connecting rod 11 are provided with a first spring limiting block 1151 and a second spring limiting block 1152 respectively.

The first spring limiting block 1151 and the second spring limiting block 1152 are configured to limit the compression spring 12 from falling off, thereby increasing the stability of the reciprocating motion of the compression spring 12.

In the embodiment, preferably, the elastic connecting rod 11 defines an installation groove 116 disposed above the first spring limiting block 1151 and the second spring limiting block 1152.

In the embodiment, when the top of the cavity 101 of the toothbrush handle 10 is assembled with the toothbrush head 20, the elastic connecting rod 11, and the pin 117, the installation groove 116 is configured for positioning and assembling precisely.

Figure 9:
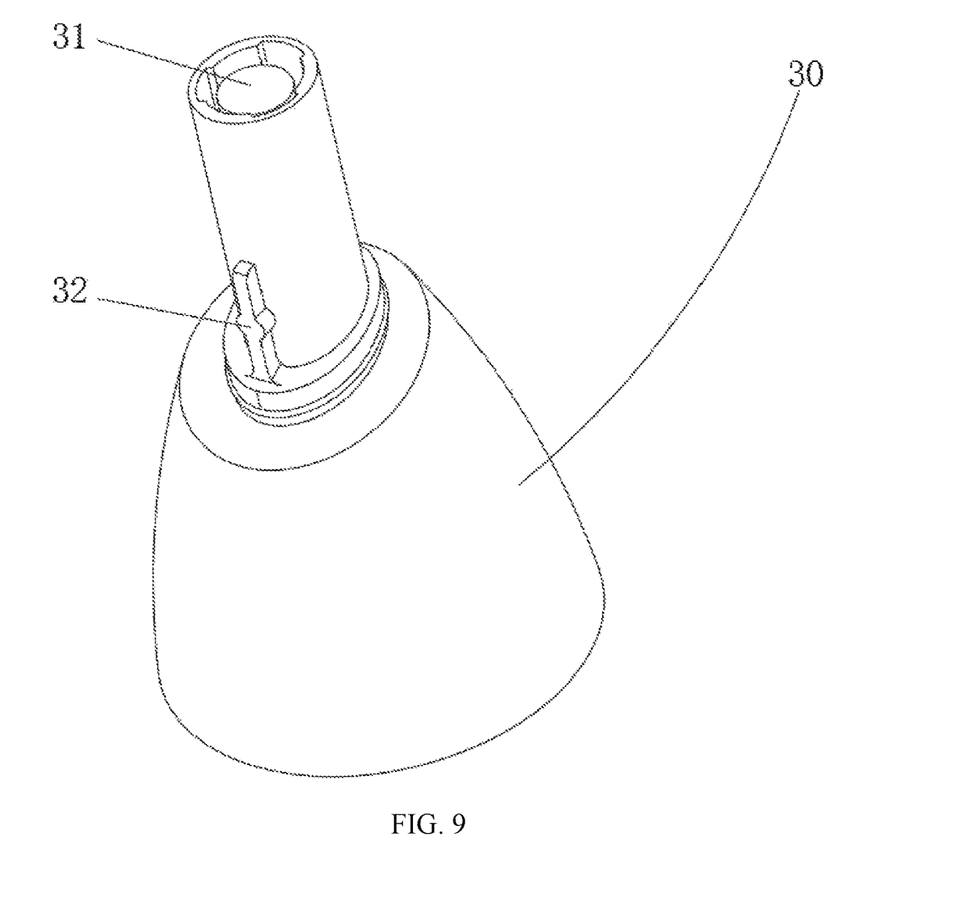
FIG. 9 illustrates a structural schematic diagram of a main body of the electric toothbrush rotating replacement head device according to the embodiment of the disclosure.

Referring to FIG. 4 and FIG. 9, in the embodiment, preferably, a part of the elastic connecting rod 11 from the installation groove 116 to the pin 117 is in a bent shape. With the bent shape, the elastic connecting rod 11 can be connected to the toothbrush head 20 through the pin 117 more conveniently, and the toothbrush head 20 can be more conveniently combined into a transmission mechanism configured to convert a linear movement into a rotary oscillation, which has a better rotation effect.

Referring to FIG. 4, in the embodiment, preferably, the spring limiting disc 111 defines a vent groove 113, and a cross bone 112 is disposed under the spring limiting disc 111.

In the embodiment, the cross bone 112 is disposed under the elastic connecting rod 11, an end face of the cross bone 112 is a curved surface contact point 114, the curved surface contact point 114 can increase the balance and reliability when the elastic connecting rod 11 contacts with the main body shaft 31 of the main body 30 of the electric toothbrush. During operation, the main body shaft 31 moves up and down in a reciprocating motion. When the main body shaft moves up, the elastic connecting rod 11 is pushed upwards. When the main body shaft 31 moves down, the elastic connecting rod 11 is compressed by the compression spring 12 and moves down with the main body shaft 31, and thus the elastic connecting rod 11 always move up and down with the main body shaft 31 in a reciprocating motion. Furthermore, the curved surface contact point 114 contacts an end of the main body shaft 31 directly.

Referring to FIG. 1, FIG. 3, FIG. 4, and FIG. 5, in the embodiment, preferably, the elastic connecting rod 11 is disposed in a spring sleeve 122 through the compression spring 12.

Figure 3:
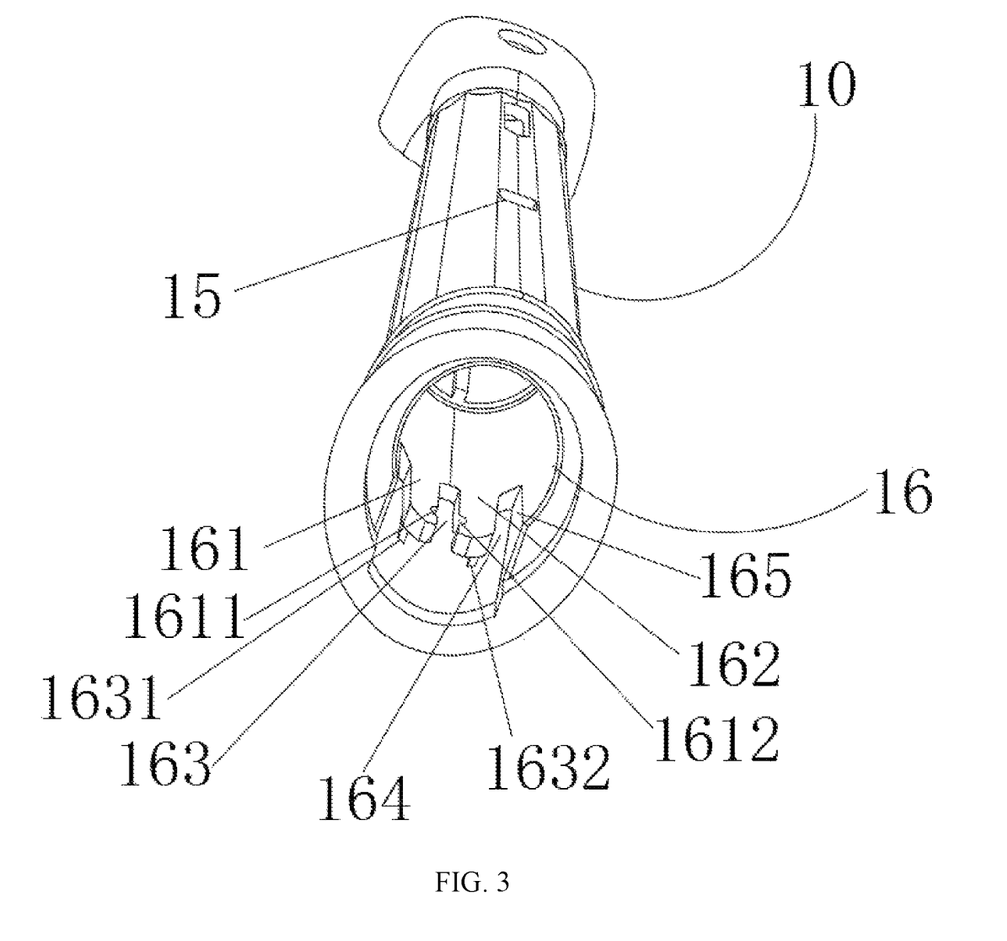
FIG. 3 illustrates a structural schematic diagram of a toothbrush handle of the electric toothbrush rotating replacement head device according to the embodiment of the disclosure.

The spring sleeve 122 is installed at the middle of the cavity 101 of the toothbrush handle 10. Preferably, a buckle 1221 is disposed at a side of the spring sleeve 122, the buckle is fitted with a buckle hole 15 in the middle of the cavity 101 of the toothbrush handle 10 to prevent the spring sleeve 122 from falling off from the toothbrush handle 10.

The spring installation hole 121 can be defined on the spring sleeve 122, and the spring installation hole 121 is a circular through-hole located in the middle of the spring sleeve 122. Furthermore, preferably, there is a sleeve convex block 124 disposed on a top of the spring sleeve 122, and an elastic connecting rod through hole 1241 is defined on the middle of the sleeve convex block 124. The elastic connecting rod through hole 1241 can be provided with limiting grooves 1242. The elastic connecting rod 11 passes through the spring sleeve 122 through the elastic connecting rod through hole 1241.

A spacing between the elastic connecting rod 11 and the spring sleeve 122 is a position for installing the compression spring 12. The compression spring 12 is sleeved onto the elastic connecting rod 11 and installed in the spring sleeve 122. The first spring limiting block 1151 and the second spring limiting block 1152 on the elastic connecting rod 11 are respectively installed in the limiting grooves 1242 of the spring sleeve 122. The force of the compressed spring 12 is borne by the first spring limiting block 1151 and the second spring limiting block 1152, thereby avoiding the deformation of the elastic connecting rod 11 caused by the tension of the compressed spring 12.

In the embodiment, the elastic connecting rod 11 defines a vent groove 113 which can quickly remove gases from the spring sleeve 122 when the toothbrush replacement head body 100 is working, thereby avoiding power loss.

Referring to FIGS. 1~6, in the embodiment, preferably, the toothbrush head 20 includes a positioning step 207, and the convex block 206 is connected to the toothbrush head 20 through the positioning step 207.

Figure 6:
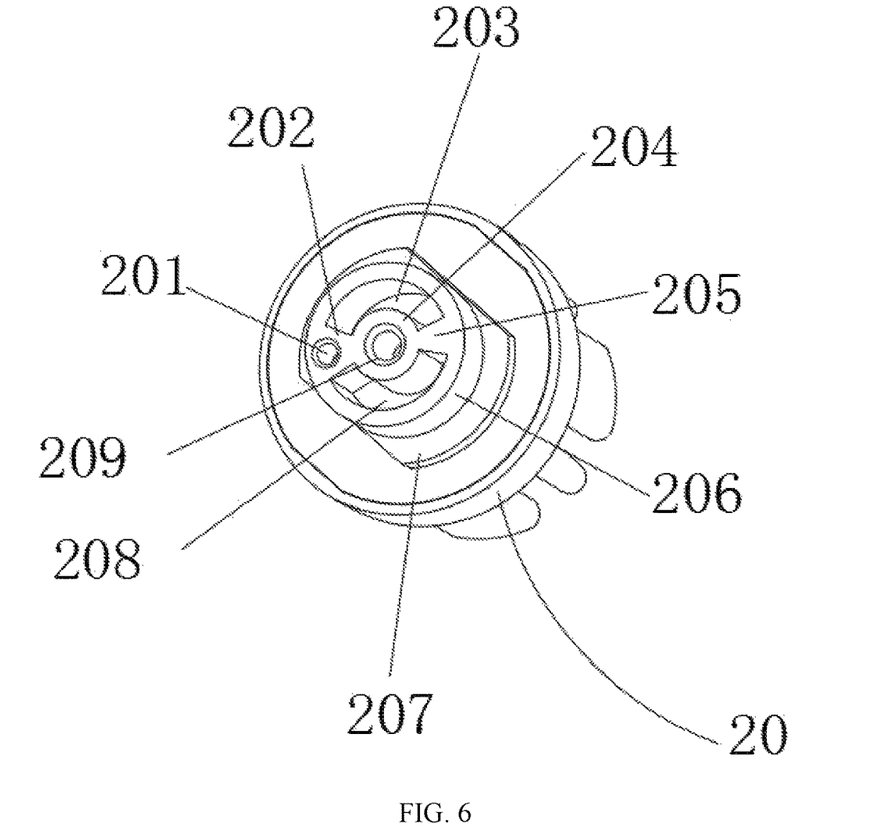
FIG. 6 illustrates a structural schematic diagram of a toothbrush head of the electric toothbrush rotating replacement head device according to the embodiment of the disclosure.

In the embodiment, furthermore, preferably, the toothbrush head 20 includes an inner cylinder 204 disposed in the convex block 206 and a rotating shaft 23 disposed on the inner cylinder 204.

In the embodiment, furthermore, preferably, the inner cylinder 204 includes a rotating shaft hole 209, and the rotating shaft 23 is connected to the inner cylinder 204 through an interference fit between the rotating shaft hole 209 and the rotating shaft 23.

In the embodiment, furthermore, preferably, the toothbrush head 20 includes a first connecting bone 202 and a second connecting bone 205, and the convex block 206 is connected to the inner cylinder 204 through the first connecting bone 202 and the second connecting bone 205.

In the embodiment, furthermore, preferably, a first spacing cavity 203 and a second spacing cavity 208 are provided between the first connecting bone 202 and the second connecting bone 205.

Figure 2:
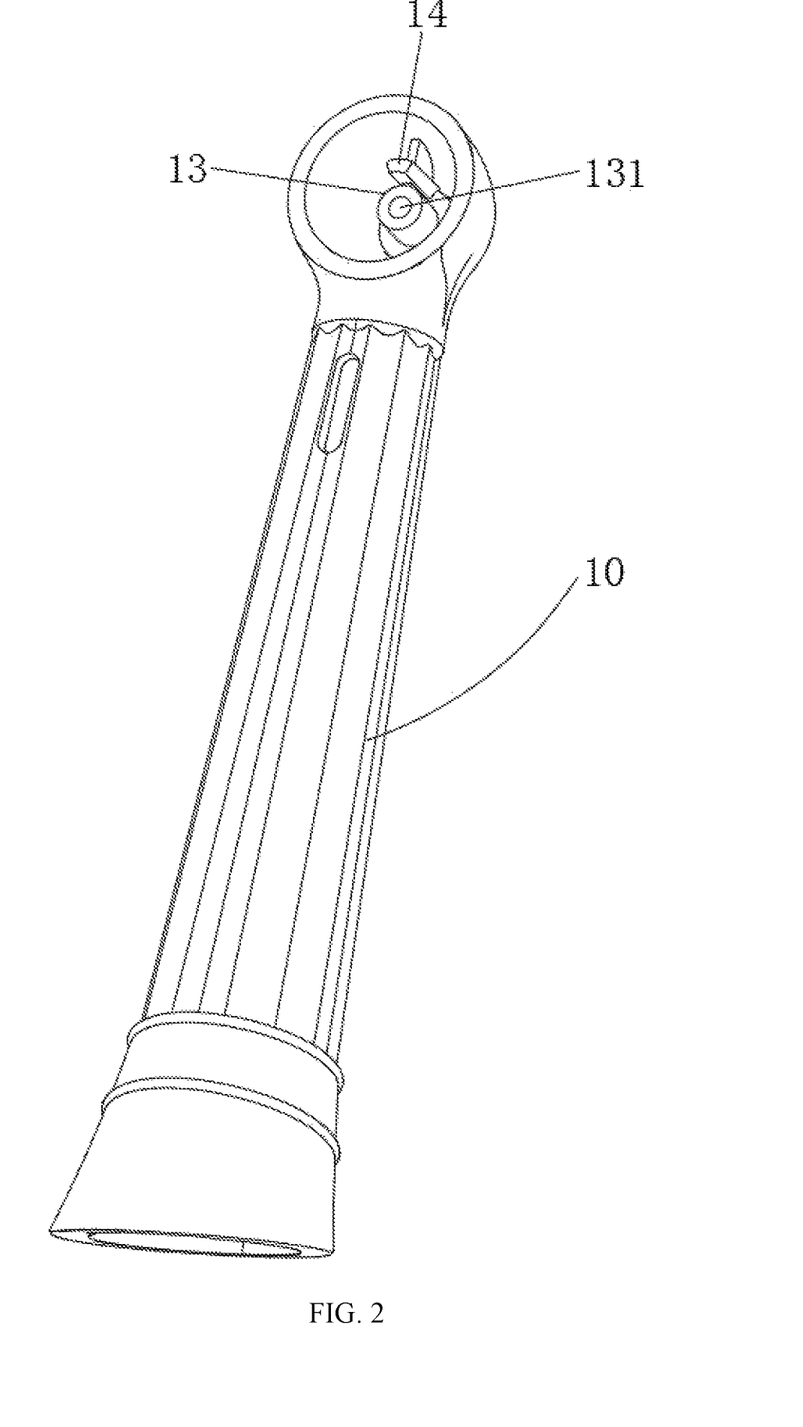
FIG. 2 illustrates another structural schematic diagram of the electric toothbrush rotating replacement head device according to the embodiment of the disclosure.

Referring to FIG. 2, in the embodiment, preferably, the top of the cavity 101 is provided with a rotation limiting column 14.

In the embodiment, preferably, a rotating shaft through hole 131 is disposed at a side of the rotation limiting column 14. Preferably, a cylinder 13 is disposed on the side of the rotation limiting column 14, and the cylinder 13 defines the rotating shaft through hole 131.

The positioning step 207 is disposed at a back of the toothbrush head 20, so that the positioning step 207 can be configured to achieve the automatic assembly of the whole of the toothbrush replacement head body 100 and increase a strength of the toothbrush head 20.

The convex block 206 is disposed at the back of the toothbrush head 20, preferably, the convex block 206 is cylindrical in shape, and the convex block 206 is an outer cylinder, and the inner cylinder 204 is disposed in the middle of the convex block 206. The convex block 206 and the inner cylinder 204 are connected to each other through the first connecting bone 202 and the second connecting bone 205, and the first spacing cavity 203 and the second spacing cavity 208 are provided between the convex block 206 and the inner cylinder 204. The first spacing cavity 203 and the second spacing cavity 208 are configured to reduce processing difficulty and increase structural strength.

The first connecting bone 202 defines the second pin hole 201 which is configured for installing the pin 117. The second pin hole 201 tightly fits with the other end of the pin 117, and the toothbrush head 20 is connected to the elastic connecting rod 11 through the pin 117.

The inner cylinder 204 is a rotation center of the toothbrush head 20, and the inner cylinder 204 defines the rotating shaft hole 209. The shaft hole 209 is connected to the rotating shaft through hole 131 through the rotating shaft 23. There is a narrow spacing between the top surface of the cylinder 13 and the top surface of the inner cylinder 204 of the toothbrush head 20, and there is a narrow spacing between the rotating shaft 23 and the rotating shaft through hole 131, so that the toothbrush head 20 can be rotated in both positive and negative directions around the rotating shaft through hole 131.

In the embodiment, preferably, the rotating shaft 23 is made of stainless steel. The rotating shaft 23 is in an interference fit with the rotating shaft hole 209. A front section of the rotating shaft 23 is designed with a multi-layer reverse buckle, and the toothbrush handle 10 is firmly connected to the toothbrush head 20 through the multi-layer reverse buckle, thereby preventing the generation of friction forces and thrust forces and preventing the toothbrush head 20 and the toothbrush handle 10 from falling off due to the friction forces and thrust forces.

In the embodiment, the rotation limiting column 14 is disposed in the cavity 101 of the toothbrush handle 10. When the toothbrush head 20 is installed, the rotation limiting column 14 is located in the first spacing cavity 203 of the toothbrush head 20. When the toothbrush head 20 rotates, the rotation limiting column 14 is configured to cooperate with the first connecting bone 202 and the second connecting bone 205 to limit a rotation angle of the toothbrush head 20.

Referring to FIG. 1, FIG. 3, FIG. 4 and FIGS. 6~9, in the embodiment, preferably, the toothbrush head 20 includes a bristle top cover 21 and a bristle bottom cover 22. The bristle top cover 21 defines bristle holes 213, and the bristle bottom cover 22 defines a glue-overflow groove 223.

Referring to FIG. 3, in the embodiment, preferably, a bottom of the cavity 101 is provided with an opening 16, a first elastic sheet 161 and a second elastic sheet 162 are disposed in the opening 16, an installation clamping groove 163 is provided between the first elastic sheet 161 and the second elastic sheet 162, and an avoid groove 164 is provided between a side wall 165 of the opening 16 and the second elastic sheet 162. The avoid groove 164 is configured to allow the first elastic sheet 161 and the second elastic sheet 162 to deform outward.

In the embodiment, furthermore, the first elastic sheet 161 defines a first clamping groove 1611 and the second elastic sheet 162 defines a second clamping groove 1612. The first clamping groove 1611 and the second clamping groove 1612 are corresponding in position and the same in size and structure.

In the embodiment, furthermore, preferably, the first elastic sheet 161 includes a first reinforcing block 1631, and the second elastic sheet 162 includes a second reinforcing block 1632.

In the embodiment, the toothbrush head 20 is installed on an upper opening (i.e., the top of the cavity 101) of the toothbrush handle 10. The disclosure is different from most methods of installing bristles through copper sheets on the market. The toothbrush head 20 uses a copper-free bristle planting process to avoid rusting pollution of the copper sheets, reduce bacterial growth, and ensure safety and hygiene.

Figure 7:
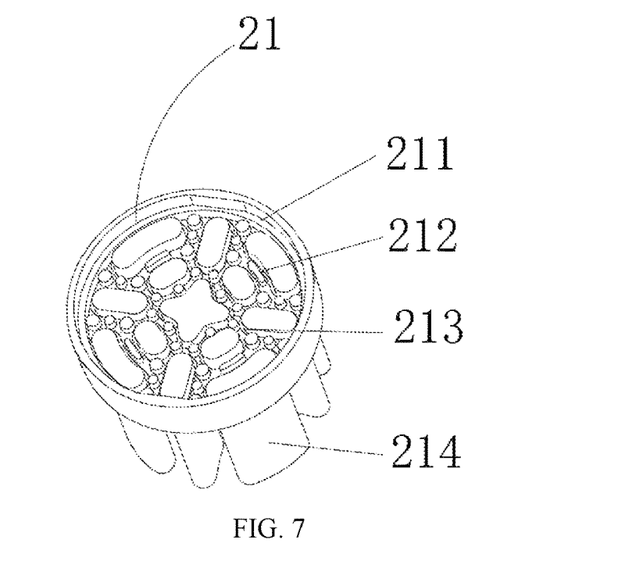
FIG. 7 illustrates a structural schematic diagram of a bristle top cover of the toothbrush head of the electric toothbrush rotating replacement head device according to the embodiment of the disclosure.
Figure 8:
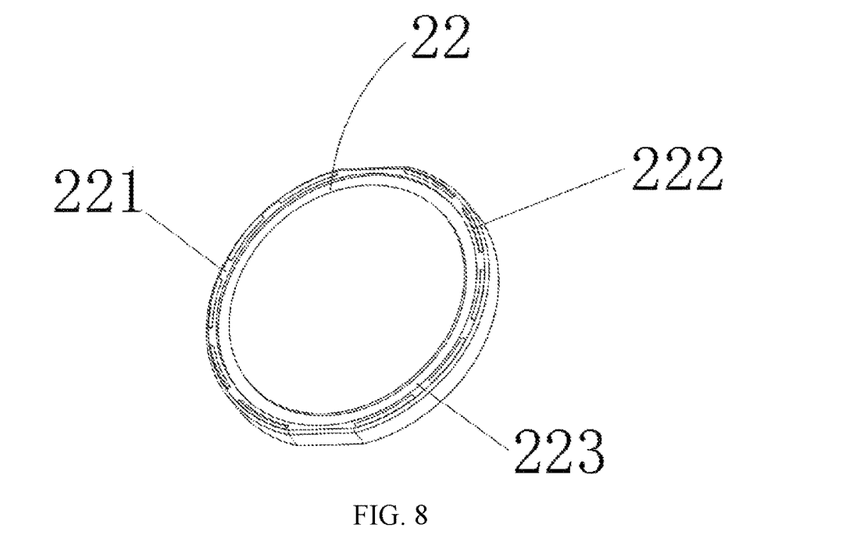
FIG. 8 illustrates a structural schematic diagram of a bristle bottom cover of the toothbrush head of the electric toothbrush rotating replacement head device according to the embodiment of the disclosure.

The toothbrush head 20 includes the bristle top cover 21 and the bristle bottom cover 22. The bristle top cover 21 is provided with a top cover connecting surface 211, hot-melt adhesive nails 212, and the bristle holes 213. A front surface of the bristle bottom cover 22 is provided with a bottom cover connecting surface 221, an ultrasonic line 222, and the glue-overflow groove 223.

In the embodiment, bristles 214 are filled in each of the bristle holes 213, and the bristles 214 and the hot-melt glue nails 212 are melted into a whole through a high-temperature hot-melt process, so that the copper-free bristle planting is realized.

The top cover connecting surface 211 of the bristle top cover 21 fits with the bottom cover connecting surface 221 of the bristle bottom cover 22. The bottom cover connecting surface 221 of the bristle bottom cover 22 is provided with the ultrasonic line 222, so that the bristle top cover 21 is configured to be fused with the bristle bottom cover 22 through an ultrasonic technology to assemble the toothbrush head 20.

In the embodiment, preferably, an inner side of the bottom cover connecting surface 221 of the bristle bottom cover 22 is provided with the glue-overflow groove 223, and the glue-overflow groove 223 is configured to avoid a larger gap between the bristle top cover 21 and the bristle bottom cover 22 when the bristle top cover 21 is fused with the bristle bottom cover 22.

In the embodiment, preferably, the positioning step 207 and the convex block 206 can be disposed on a back surface of the bristle bottom cover 22.

Referring to FIG. 3 and FIG. 9, in the embodiment, the bottom of the cavity 101 of the toothbrush handle 10 can be installed and connected on the main body 30 of the electric toothbrush.

In the embodiment, the bottom of the cavity 101 is provided with the opening 16, and the walls on both sides of the opening 16 respectively are provided with the first elastic sheet 161 and the second elastic sheet 162. The installation clamping groove 163 is provided between the first elastic sheet 161 and the second elastic sheet 162, and the avoid groove 164 is provided between the second elastic sheet 162 and the side wall 165 of the opening 16. The first elastic sheet 161 defines the first clamping groove 1611, and the second elastic sheet 162 defines the second clamping groove 1612. The first elastic sheet 161 further includes the first reinforcing block 1631, and the second elastic sheet 162 further includes the second reinforcing block 1632.

The installation clamping groove 163 and a groove mouth of the avoid groove 164 are chamfered to guide the toothbrush handle 10 to the main body 30 of the electric toothbrush.

Preferably, each of the first clamping groove 1611 and the second clamping groove 1612 is in a semi-circular shape. The first clamping groove 1611 and the second clamping groove 1612 are configured to fit with main body buckle, thereby preventing the toothbrush handle 10 from falling off. In the installation clamping groove 163, the first clamping groove 1611 and the second clamping groove 1612 defines a first clamping position and a second clamping position, and each of the first clamping position and the second clamping position is in a semi-circular shape.

When the toothbrush replacement head body 100 is installed, the installation clamping groove 163 of the toothbrush handle 10 will be stretched, so that the main body buckle 32 can enter the first clamping position and the second clamping position respectively through the installation clamping groove 163 and the avoid groove 164, the first clamping position and the second clamping position on both sides act at the same time to clamp the main body buckle 32, and the toothbrush replacement head body 100 can be reliably assembled with the main body 30 of the electric toothbrush.

The electric toothbrush rotating replacement head device of the disclosure is driven by an external force (the external force is provided by the main body 30 of the electric toothbrush). The rebound of the compression spring 12 is taken as a power source of the device, and the compression spring 12 is configured to drive the toothbrush head 20 through the elastic connecting rod 11 and the pin 117. The rotating shaft 23 made of stainless steel is taken as the center to swing back and forth, so as to realize the cleaning effect of the bristles 214 on teeth.

The electric toothbrush rotating replacement head device of the disclosure optimizes the design of related art, has a simpler structure, a simpler installation, higher transmission efficiency and a better cleaning effect.

The above are only some embodiments of the disclosure and do not limit the scope of protection of the disclosure. Any equivalent structural changes made by using the description and attached drawings of the disclosure, direct applications, and indirect applications in other related technical fields should belong to the scope of protection of the disclosure.

What is claimed is:

1. An electric toothbrush rotating replacement head device, wherein the device comprises a toothbrush replacement head body, the toothbrush replacement head body comprises a toothbrush handle and a toothbrush head, the toothbrush handle defines a cavity, and the toothbrush head is disposed on a top of the cavity;

the device comprises:
an elastic connecting rod disposed in the cavity, and a top of the elastic connecting rod defining a first pin hole;

a spring limiting disc disposed on a bottom of the elastic connecting rod;
a pin disposed in the first pin hole, and a diameter of the first pin hole being greater than a diameter of the pin;
a first spring limiting block and a second spring limiting block disposed on two sides of the elastic connecting rod respectively; and
a compression spring disposed on the spring limiting disc, and the elastic connecting rod being disposed in the compression spring; and
the toothbrush head comprises a convex block, the convex block defines a second pin hole, and the elastic connecting rod is inserted into the second pin hole through the pin and connected to the toothbrush head.

2. The electric toothbrush rotating replacement head device as claimed in claim 1, wherein the elastic connecting rod defines an installation groove disposed above the first spring limiting block and the second spring limiting block.

3. The electric toothbrush rotating replacement head device as claimed in claim 2, wherein a part of the elastic connecting rod from the installation groove to the pin is in a bent shape.

4. The electric toothbrush rotating replacement head device as claimed in claim 1, wherein the spring limiting disc defines a vent groove, and the device comprises a cross bone disposed under the spring limiting disc.

5. The electric toothbrush rotating replacement head device as claimed in claim 1, wherein the device comprises a spring sleeve, and the elastic connecting rod is disposed in the spring sleeve through the compression spring.

6. The electric toothbrush rotating replacement head device as claimed in claim 5, wherein a top of the spring sleeve defines limiting grooves.

7. The electric toothbrush rotating replacement head device as claimed in claim 6, wherein the device comprises a buckle disposed a side of the spring sleeve.

8. The electric toothbrush rotating replacement head device as claimed in claim 1, wherein the toothbrush head comprises a positioning step, and the convex block is connected to the toothbrush head through the positioning step.

9. The electric toothbrush rotating replacement head device as claimed in claim 8, wherein the toothbrush head comprises an inner cylinder disposed in the convex block and a rotating shaft disposed on the inner cylinder.

10. The electric toothbrush rotating replacement head device as claimed in claim 9, wherein the inner cylinder defines a rotating shaft hole, and the rotating shaft is connected to the inner cylinder through an interference fit between the rotating shaft hole and the rotating shaft.

11. The electric toothbrush rotating replacement head device as claimed in claim 10, wherein the toothbrush head comprises a first connecting bone and a second connecting bone, and the convex block is connected to the inner cylinder through the first connecting bone and the second connecting bone.

12. The electric toothbrush rotating replacement head device as claimed in claim 11, wherein a first spacing cavity and a second spacing cavity are provided between the first connecting bone and the second connecting bone.

13. The electric toothbrush rotating replacement head device as claimed in claim 12, wherein the toothbrush handle comprises a rotation limiting column disposed at the top of the cavity.

14. The electric toothbrush rotating replacement head device as claimed in claim 13, wherein a rotating shaft through hole is defined at a side of the rotation limiting column.

15. The electric toothbrush rotating replacement head device as claimed in claim 1, wherein the toothbrush head comprises a bristle top cover and a bristle bottom cover; the bristle top cover defines bristle holes, and the bristle bottom cover defines a glue-overflow groove.

16. The electric toothbrush rotating replacement head device as claimed in claim 1, wherein a bottom of the cavity is provided with an opening, a first elastic sheet and a second elastic sheet are disposed in the opening, an installation clamping groove is provided between the first elastic sheet and the second elastic sheet, and an avoid groove is provided between a side wall of the opening and the second elastic sheet.

17. The electric toothbrush rotating replacement head device as claimed in claim 16, wherein the first elastic sheet defines a first clamping groove and the second elastic sheet defines a second clamping groove.

18. The electric toothbrush rotating replacement head device as claimed in claim 17, wherein the first elastic sheet and the second elastic sheet comprise reinforcing blocks respectively.

19. An electric toothbrush rotating replacement head device, wherein the device comprises a toothbrush head, a toothbrush handle, an elastic connecting rod, a compression spring, and a spring sleeve; the toothbrush handle defines a cavity, and the toothbrush head is disposed on a top of the cavity; the spring sleeve, the compression spring, and the elastic connecting rod are sequentially arranged in the toothbrush handle from outside to inside;
wherein the toothbrush head comprises:
a bristle top cover;
a bristle bottom cover, disposed on the bristle top cover;
a positioning step, disposed on the bristle bottom cover, and the bristle top cover and the positioning step being located at two sides of the bristle bottom cover;
a convex block, disposed on the positioning step;
a first connecting bone, connected to the convex block;
a second connecting bone, connected to the convex block; wherein a first spacing cavity is provided between the first connecting bone and the second connecting bone; and
an inner cylinder, disposed in the convex block;
wherein the toothbrush handle defines an opening at a bottom of the cavity and a buckle hole, the buckle hole is configured to be fitted with a buckle of the spring sleeve, and the toothbrush handle comprises:
a rotation limiting column, disposed at the top of the cavity and disposed in the first spacing cavity;
wherein the rotation limiting column is configured to cooperate with the first connecting bone and the second connecting bone to limit a rotation angle of the toothbrush head; and
a cylinder, disposed at a side of the rotation limiting column and configured to match with the inner cylinder through a rotating shaft;
wherein the elastic connecting rod defines a first pin hole disposed at a top of elastic connecting rod, a pin is disposed in the first pin hole, and the compression spring is configured to drive the toothbrush head through the elastic connecting rod and the pin.

20. An electric toothbrush rotating replacement head device, wherein the device comprises a toothbrush replacement head body, the toothbrush replacement head body comprises a toothbrush handle and a toothbrush head, the toothbrush handle defines a cavity, and the toothbrush head is disposed on a top of the cavity;

wherein the device comprises:

an elastic connecting rod disposed in the cavity, and a top of the elastic connecting rod defining a first pin hole;

a spring limiting disc disposed on a bottom of the elastic connecting rod;

a pin disposed in the first pin hole, and a diameter of the first pin hole being greater than a diameter of the pin;

a compression spring disposed on the spring limiting disc, and the elastic connecting rod being disposed in the compression spring; and     wherein the toothbrush head comprises a convex block, the convex block defines a second pin hole, and the elastic connecting rod is inserted into the second pin hole through the pin and connected to the toothbrush head;

wherein the spring limiting disc defines a vent groove, and the device comprises a cross bone disposed under the spring limiting disc.

* * * * *